United States Patent [19]

Moens

[11] 4,314,853
[45] Feb. 9, 1982

[54] PROCESS OF MIXING REINFORCING ELEMENTS WITH CASTABLE MATERIAL

[75] Inventor: Joris Moens, Kortrij, Belgium

[73] Assignee: N.V. Bekaert S.A., Zwevegem, Belgium

[21] Appl. No.: 113,303

[22] Filed: Jan. 18, 1980

Related U.S. Application Data

[62] Division of Ser. No. 850,246, Nov. 10, 1977, Pat. No. 4,224,377, which is a division of Ser. No. 456,592, Apr. 1, 1974, abandoned.

[30] Foreign Application Priority Data

Apr. 16, 1973 [GB] United Kingdom ............... 18322/73

[51] Int. Cl.³ ............................................... C04B 7/02
[52] U.S. Cl. ..................................... 106/99; 106/100; 106/109; 428/369
[58] Field of Search ............... 428/292, 294, 369, 359, 428/361, 362, 371, 379, 902, 375, 222, 913; 106/99, 109, 100

[56] References Cited

U.S. PATENT DOCUMENTS 3,289,371 12/1966 Pearson .
3,716,386 2/1973 Kempster .

OTHER PUBLICATIONS

Marsh, "Glass Fibers in Concrete: The Current Status", May, 1972.
Schwartz, "Steel Fiber Production and Related Considerations", May, 1972.

Primary Examiner—Marion McCamish
Attorney, Agent, or Firm—Edward J. Brenner

[57] ABSTRACT

Reinforcing members for the reinforcement of hardenable or settable material such as concrete or mortar are disclosed. The reinforcing members comprise a plurality of wire elements such as fibers united by a binder which loses its binding ability when mixed with the settable material, thereby releasing the elements in a random manner in the matrix.

Methods are also disclosed for mixing the reinforcing members in the matrix and for making the reinforcing members.

12 Claims, 4 Drawing Figures

PROCESS OF MIXING REINFORCING ELEMENTS WITH CASTABLE MATERIAL

CROSS-REFERENCE TO RELATED APPLICATION

The present application is a division of Ser. No. 850,246, filed Nov. 10, 1977, now U.S. Pat. No. 4,224,377, which in turn is a division of Ser. No. 456,592 filed Apr. 1, 1974, now abandoned.

This invention relates generally to the reinforcing of hardenable or settable materials such as concrete, mortar, rubber, synthetic resins, plastics, and the like.

BACKGROUND AND OBJECTS

This invention relates to the reinforcement of castable materials, particularly but not exclusively mortar or concrete, by the distribution therein at the mixing stage of a multiplicity of comparatively small elongate metallic elements, e.g. of steel or iron. Such elements may each comprise a single metal filament or they may comprise two or more such filaments combined together, e.g. in the form of a twisted strand, either of which possibilities is intended to be within the scope of the term "reinforcing element" as used in this specification. More specific examples of such elements are ones made of round wire, ones made of straight or helically twisted strip, or made with lengthwise varying cross-section to improve the adherence with the castable material, and ones made of two, three, or preferably four round wires (e.g. each of 0.175 mm diameter) twisted together in the form of a cable. The thickness of such small metallic elements generally ranges between about 0.1 mm and 1 mm, and the length-to-thickness ratio usually ranges between about 50 and 200.

In the field of mortar and concrete it is known that the tensile strength of the material rises approximately linearly with increasing percentage of such reinforcing elements which are equally distributed throughout the material, and this principle can also be used in other castable materials, in particular those which use a water-activated binder. These are materials comprising a binder such as chalk or cement, which hardens by mixing with water and binds together the other granular ingredients, such as sand, of the material. Such materials are usually formed by mixing together the necessary ingredients, such as cement, and/or other water-activated binder, sand, aggregate, additional polymer material in some cases, and water, into a soft mix ready to harden as the binder is activated. The reinforcing elements can be added before or during mixing of the ingredients together. To obtain high strength, it is desirable to introduce a high percentage of reinforcing elements into the mixture, but there is a limit to this percentage due to the reinforcing elements entangling with each other to form balls and other undesired conglomerations.

The length-to-thickness ratio of the reinforcing elements is chosen as a compromise between the requirement of good mixability of the reinforcing elements and the requirement of good reinforcing effect per volume percent of reinforcing elements. On one hand, for good mixability short thick elements are to be preferred. But on the other hand such elements are undesirably thick and strong from the point of view of adherence to the surrounding material, as a result of which the amount of metal used is not distributed so as to ensure an optimal reinforcing effect. Usually, and especially in the field of mortar and concrete, a length-to-thickness ratio is chosen in a range between 50 and 200, preferably between 70 and 160. For non-straight elements the length is measured not as the developed length of the element after it has been straightened, but as the rectilinear distance from extremity to extremity. For elements of non-circular or non-constant cross-section the thickness is measured as the diameter (or the average diameter over the different cross-sections if appropriate) of a circle of the same cross-sectional area. The thickness of the elements used generally ranges between 0.1 mm and 1 mm.

But even within this compromise range of length-to-thickness ratio it is difficult to attain desirably high strength of the reinforced material, because good mixability and good reinforcing effect of the reinforcing elements are still both required but up to now cannot together be sufficiently achieved because the two requirements have been incompatible. In order to make the material as strong as possible it has been necessary up to now to introduce and mix the elements in percentages approaching the limit of mixability and taking the utmost care to prevent entanglement. The reinforcing elements are however delivered in containers in which they are already entangled with each other due to vibrations and shocks during transport. This mass of entangled elements does not lend itself to pouring a desired dose into the mixture. As a second drawback, the reinforcing elements of this entangled mass cannot be poured into the mix in percentages approaching the limit of mixability, because at these percentages the mixing movement will not cause disentanglement.

A known way of reducing entanglement when introducing a high percentage of reinforcing elements into a mix is to introduce them in the form of a continuous rain of separate elements. The mass of reinforcing elements is poured into a hopper located above the mix, and the bottom exit for the reinforcing elements comprises a mill where the elements are separated from each other by mechanical or pneumatic means and are separately dropped into the mix. This solution is not very practical because it requires additional apparatus which is an additional cost, takes up room and makes the mix less accessible. Furthermore, it requires an uneconomically long time for introducing the reinforcing elements into the mix.

Another method of reducing entanglement during mixing has been proposed in U.S. Pat. No. 3,716,386, where the fibers are firstly treated with a high-viscosity friction-reducing substance prior to the bringing together of the fiber constituent with the basic constituent of the mix. This method makes the mixing operation more complicated and does not allow to prevent entanglement in the containers during transport.

As a result, although the technique of using reinforcing elements of the kind described to reinforce mortar or concrete can yield a high strength product, the problem of how to deliver the reinforcing elements and how to mix them in a simple way so as to prevent entanglement, is still a factor causing reluctance to adopt this technique on a large scale, and also prevents the achievement of strength values with a minimum amount of steel which could make this technique particularly advantageous from the point of view of competition with conventional reinforcement.

According to the invention, the process of introducing the small elongate metallic reinforcing elements into the castable material comprises introducing into a mix for said material a multiplicity of reinforcing members being in the form of a group of such elements combined together by a binder affectable by a disintegration ingredient, then mixing said mix to distribute said reinforcing members substantially uniformly therein, then causing said reinforcing members to subdivide and further to disintegrate into separate elements by means of said disintegration ingredient, and then further mixing said mix to distribute said separate elements uniformly therein.

Viewed from another aspect, the invention provides the reinforcing members being in the form of comparatively small elongate metallic reinforcing elements such like steel or iron fibers, combined together in a group by a binder affectable by a disintegration ingredient suitable to be included in the castable material.

The invention is particularly applicable in the field of castable material on the basis of water-activated binder, such like mortar and concrete, as herein described. The preferred range of thickness (or diameter in the case of a circular cross-section) lies then between 0.1 mm and 1 mm and preferred length-to-thickness ratio (or length-to-diameter ratio) ranges then between 50 and 200, more preferably between 70 and 160. Although these limits are not to be considered as absolute limits, the elements between this limits give a greatly superior combination of results to elements substantially outside these limits.

In short, the invention provides the method of mixing the reinforcing elements in two periods: a first period of uniformly mixing, from a microscopical point of view, the elements which are kept in the form of small groups of combined reinforcing elements, which groups are uniformly distributed, and a second period of uniformly mixing the individual elements, from a microscopical point of view, after the groups have disintegrated. The danger of entanglement during the first period is low because the combined groups have better mixability than the individual elements, and the danger during the second period is also low because this second period can be kept short, as a result of the preliminary macroscopic distribution.

The reinforcing elements are preferably made of hard drawn steel having a tensile strength of at least 85 kg/mm$^2$, preferably at least 120 kg/mm$^2$ but they may be made of cast iron as disclosed e.g. in French Pat. No. 2,091,734. Iron alloyed with other metals, such as nickel or chrome for improving corrosion resistance, is also possible. A zinc, aluminum, organic or other coating can also be applied, for improving adhesion and/or corrosion resistance.

As already mentioned individual reinforcing elements easily form into entangled conglomerations which have a strong resistance to disintegration. In carrying out the invention, the reinforcing elements are purposely provided in the form of small groups of such elements combined together by a binder, and so forming the reinforcing members, but taking care of two points.

Firstly, the reinforcing members shall have a higher mixability than the individual reinforcing elements. This means that a group structure must be chosen whose tendency to entanglement into greater conglomerations is smaller than the same tendency of the individual reinforcing elements. It will be clear for those skilled in the art what group structures should be chosen and what should not, but instructions for a good choice will be given below. The mixability, or the inverse of the tendency to entanglement is measured by the maximum percentage which can be introduced, in the form of a continuous rain, into a mix before conglomeration into entangled balls occurs.

Secondly, the binder used in the reinforcing member must fulfill certain conditions. On one hand, the reinforcing members must have the time to be mixed until substantially uniform distribution in the mix, before the occurrence of any substantial subdivision as the start for further disintegration into separate reinforcing elements. This needs at any rate a sufficient bonding strength of the binder, so as to keep the reinforcing elements together and to allow the reinforcing members to endure the mixing movement during that time without substantial subdivision. On the other hand the binder must be sufficiently affectable by another ingredient of the mix, in order to allow the subdivision and further disintegration of the reinforcing members at the desired moment. This is achieved by using a binder which is, e.g. soluble in water. Such other ingredient may be regarded as the disintegration ingredient.

The desired moment of subdivision and further disintegration can then be controlled either by choice of the moment of introduction of the said disintegration ingredient or by the choice of an appropriate duration of resistance of the binder to the disintegration ingredient. (The latter effect may be obtained, for example, by varying the thickness of the binder film or varying the composition of soluble and insoluble materials in the binder.) In the first case the disintegration ingredient is introduced in the mix after introduction of said reinforcing members, and the mixing to distribute said reinforcing members is carried through during the delay time between introduction of the reinforcing members and the moment when said members are substantially subdivided. In the second case said reinforcing members are introduced in the mix comprising said disintegration ingredient (because it is introduced at the same time or was already introduced before), and the mixing to distribute said reinforcing members is carried through during the delay time before said members are substantially subdivided. In this second case, reinforcing members are chosen having a resistance to the disintegration ingredient which procures said delay time.

Thus during the first mixing period any subdivision of the reinforcing members or of the groups of reinforcing elements is retarded by an appropriate control of the said delay time between introduction and substantial subdivision of the reinforcing members. During that time the groups are well mixed before substantial subdivision occurs. Substantial subdivision of the groups may be regarded as having been reached when the total remaining number of whole groups and part groups is treble the initial number of groups introduced. If an unreasonable number of groups is not introduced there is no danger of entanglement into balls during the first mixing period, because the groups can be formed to have less tendency to entangle than the individual reinforcing elements.

The second mixing period can be regarded as starting when substantial subdivision is reached. Then the groups rapidly continue to subdivide until substantial disintegration into separate reinforcing elements is reached and these elements must then rapidly be mixed because the danger of entanglement into balls exists. But the second period can be kept short, thanks to the substantially equal distribution of the groups obtained during the first period, in which substantially no danger of such entanglement existed. If not introduced in unreasonable numbers, reinforcing elements in sufficient concentration to cause such entanglement in the long run are not given the time to entangle before the mix is ready. So it has been observed that this mixing in two stages leads to higher percentages of reinforcing elements being mixable without entanglement into balls than if they had been introduced as separate elements.

By being brought together in groups, and forming reinforcement members, the mass of reinforcing elements shows a lower tendency to entangle during transport and during pouring out into the mix, and this allows in most cases the mass to be dumped into bulk into the mix instead of forming a continuous rain.

It is to be clearly understood that the process of the invention should not be regarded as being divided into separate and distinct stages in a first one of which the groups of reinforcing elements are distributed and in a second of which they subdivide and disintegrate into separate reinforcing elements and in a third of which the separated elements are mixed, because more often that not there will be some overlap of these stages. This is particularly so, of course, when the disintegration ingredient is present in the mix when the groups of reinforcing elements are first introduced, as a greater or less degree of subdivision of individual groups is then almost bound to occur during the first mixing stage.

Accordingly, a primary object of this invention is to provide reinforcing members for settable material which overcome the disadvantages of prior art reinforcements.

Another object of this invention is to provide reinforcing members formed of discrete reinforcing elements which members dissociate during mixing with a settable material.

A further object of this invention is to provide reinforcing members formed of discrete reinforcing elements united by a binder which is affected by one or more ingredients in the settable material so as to release the elements.

Still another object of this invention is to provide reinforcing members for a settable material which enable more random and uniform dispersal of reinforcement throughout the material.

Still a further object of this invention is to provide reinforcing members for a settable material which enable the introduction of a greater percentage of reinforcing elements into the material without balling up of the elements.

Yet another object of this invention is to provide an improved method for the introduction of reinforcing wires into a hardenable material.

Yet a further object of this invention is to provide a method for introducing a greater percentage of reinforcing elements into a settable material randomly.

Another object of this invention is to provide an improved method for reinforcing a settable material.

A further object of this invention is to provide a method for producing improved reinforcing members.

DESCRIPTION OF THE DRAWINGS

Some embodiments of the invention will now be described by way of example and with reference to the accompanying drawings, in which.

Figure 1:
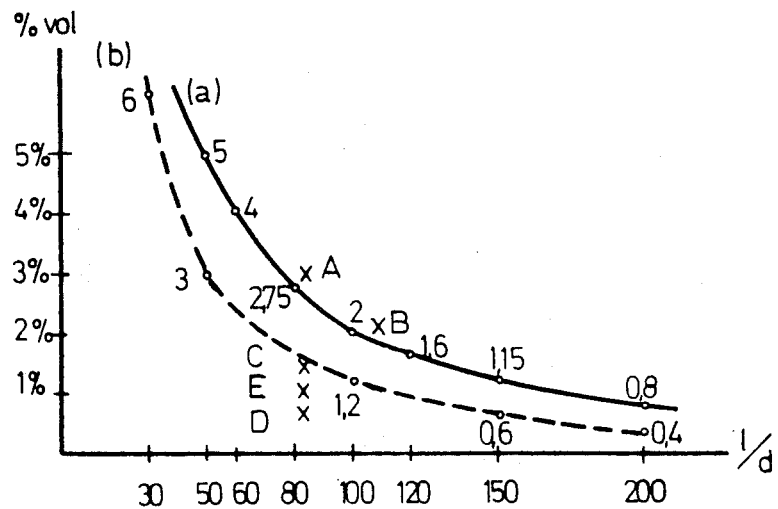
FIG. 1 shows two curves of mixability, one for mortar and one for concrete.

The first main point to take account of in designing the structure of reinforcing members according to the invention is that their tendency to entangle into balls must be sufficiently low as not to present any substantial danger of such entanglement during the first mixing period. This means that the tendency to such entanglement of a mass of such reinforcing members must be substantially less than the tendency to such entanglement of the same mass of separate reinforcing elements. In other words the mixability of the reinforcing members must be substantially higher than that of the reinforcing elements, e.g. at least 10% higher, but in general a mixability of at least 50% higher is to be aimed at. As a standard for mixability is taken the maximum percentage of reinforcement by volume which can be introduced as a continuous rain, before entanglement into balls occurs, in a mix composed of 2 parts by weight of sand, 1 part by weight of cement and ½ part by weight of water.

The higher mixability will generally be obtained when the structure of the reinforcing member is such as not to have holes or recesses on the one hand, or projections on the other hand, which would be such as to cause entanglement of the members with the other. To achieve this it is preferable to use regular and compact structures in which the ratio of the greatest dimension with respect to one or both of the two dimensions perpendicular thereto is smaller than the same ratio in the constituent reinforcing elements. With such reinforcing members it is possible to introduce and to distribute, from a microscopical point of view, a greater mass of reinforcing elements than would have been possible with other methods. And then, when these reinforcing members come to disintegrate, their constituent elements are distributed evenly, from a microscopical point of view, before they have time to conglomerate.

So, for the reinforcing members comprising groups of reinforcing elements in the form of round wire ends, the mixability was studied in the following way. First the mixability of the individual reinforcing elements was studied as a function of the length-to-diameter ratio. It was found that the curve of mixability rapidly falls with increasing (length-to-diameter or thickness) l/d ratio. This is shown as curve (a) in FIG. 1 for the standard mortar composition already mentioned comprising 2 parts by weight of sand, 1 part of cement and ½ part of water, and using straight steel reinforcing elements of circular cross-section of 0.35 mm diameter. The percentages shown are percentages by volume. It was also found that approximately the same curve applied for any reinforcing element diameter in the range between 0.1 mm and 1 mm. But it was also found that approximately the same curve applies for bundles of parallel reinforcing elements for which the l/d ration is calculated as the l/d-ratio of a single element having the same cross-sectional area as the bundle. So, a bundle of n reinforcing elements behaves like a single element with an l/d-ratio which is $\sqrt{n}$ times smaller than for the single element. It is concluded that the mixability of bundles of parallel reinforcing elements can be approximately predicted quantitatively, when the curve of mixability is known of the constituent elements. So, preferably the reinforcing elements making up the reinforcing members are aligned in parallel relationship, and preferably aligned side by side e.g. as shown in FIG. 2.

In another type of reinforcing member according to the invention the reinforcing elements are of helical form and are in intertwined relationship. The reinforcing members then look like chopped pieces of a cable composed of one or more twisted strands. This form of the invention has the advantage of making waste cable usable.

Figure 3:
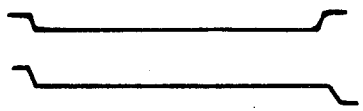
FIG. 3 shows examples of reinforcing elements for use in practising the invention.

Reinforcing members according to the invention can comprise not only bundled structures, but also substantially uniplanar structures so long as they are sufficiently regular and compact. The reinforcing elements used are then preferably straight or nearly straight. Preferred forms are elements with straight central portions and bent extremities for enhancing the reinforcing effect of individual elements (see FIG. 3). Other preferred forms are helicoids of large pitch obtained by chopping cable structures. The cross-section may be of a circular or flatted form and the reinforcing elements may be covered with any material, or surface roughened, for enhancing their adhesion with the material to be reinforced, or to prevent corrosion.

With all these structures of reinforcing members not only can the mass of reinforcing elements be distributed in higher concentration, but also their entanglement in containers during storage and transportation can be substantially prevented, and the reinforcing members can be dumped in bulk into the mass of mortar or concrete in the mixer and then be mixed up to a regular distribution. Reinforcing members with sufficient mixability must then be used, e.g. having a mixability equal to that of straight elements having an l/d ratio less than 50. When using for instance slightly curved reinforcing elements (such like e.g. those of FIG. 3), with an equivalent straight l/d-ratio much higher than 50, these elements will be bundled. (The equivalent straight l/d-ratio is the l/d-ratio of a straight reinforcing element having the same mixability). Because of the fact that bundles of n parallel elements behave like single elements with an l/d-ratio which is $\sqrt{n}$ times smaller, the appropriate minimal number to be bundled will be given by $$\sqrt{n} > (l/d)_{eq}/50$$

in which $(l/d)_{eq}$ is the equivalent straight length to diameter ratio.

This formula is not to be considered as providing an absolute distinction between reinforcing members which are sufficiently mixable to be kept in containers and dumped in bulk without entangling into balls and those which are not. The formula is more to be considered as a general rule for estimating the number of reinforcing elements which would preferably be bundled. In the preferred range of l/d-ratio between 70 and 160, bundling in a range for n between 7 and 15, depending upon the l/d-ratio used, will be convenient.

The second main point to take account of in designing the reinforcing members lies in the use of an appropriate binder. As explained before, the binder must have a sufficient bonding strength to keep the reinforcing elements together during the first period of mixing, and on the other hand the binder must have a sufficient affectability by another ingredient of the mix, in order not unnecessarily prolong the second period of mixing.

The necessary bonding strength of the binder depends on the mixing conditions and the desired mixing time during the first period. The mixing conditions may differ from mixture to mixture, e.g. in the mechanical forces tending to subdivide the reinforcing members, due to different composition and moistness and different mixing movements and forces. And the desired mixing time during the first period may also vary from application to application. Some mixers are indeed mounted on lorries and can be expected to continue to mix during journeys of 15 minutes and more, whilst other mixers for great production are expected to make a mix in not more than one minute. As the second period must be kept short, these differences of total mixing time must be accounted for by a variable first period. This can be achieved by two factors: by the choice of the moment at which the disintegration ingredient is introduced in the mix and brought together with the reinforcing members and/or by presetting the duration of resistance to the disintegration ingredient in the given mixing conditions, by an appropriate choice of the composition and the thickness of the binder, and of the type of disintegration ingredient.

In the most severe case, especially during transportation on a vehicle where the disintegration ingredient is only introduced at the end, the reinforcing members are expected to keep together during several minutes, e.g. 30 minutes, before the disintegration ingredient is introduced. In the less severe case, the first period is kept as short as possible, the disintegration ingredient is in the mixture when the reinforcing members are introduced, and the delay time for the first period mixing is procured by the duration of resistance of the reinforcing members to the disintegration ingredient. When the first period is kept as short as possible, the reinforcing members are only expected to keep together during 10–15 seconds, and so they must also be able, a fortiori, to keep together that time in absence of disintegration ingredient.

So, as a standard of bonding strength of the binder in absence of the disintegration ingredient, such reinforcing members must be able to keep together without substantial subdivision, in standard mixing conditions as determined below, during at least 10 seconds, and preferably during at least 30 minutes. As already determined in the introduction, substantial subdivision is agreed to be reached, when the total number of undivided and subdivided reinforcing members reaches treble the number of initially introduced members.

The second condition imposed on the binder, apart from sufficient bonding strength in absence of disintegration ingredient to be called a binder, is a sufficient, but in some cases not excessive affectability by another ingredient of the mix. When such disintegration ingredient is introduced in the mix, the reinforcing members then start to subdivide and further to disintegrate down to the reinforcing elements by the combined action of the mechanical forces caused by the mixing movements and the reaction of the disintegration ingredient with the binder. Subdivision is caused to start directly when the reinforcing members were already mixed before, but for the case where the reinforcing members are also to be mixed before subdivision begins, the binder is made less affectable in order to resist for the delay time necessary to reach uniform distribution of the members.

Such disintegration ingredient is to be part of the mix, e.g. water, the effect on the binder being for example by chemical reaction decomposition) of by its solubility dissolution when in contact with the disintegration ingredient. This ingredient can then be introduced into the mix at the appropriate moment, and it must therefore be usable as an ingredient without substantial complication of the mixing process and without substantial harm to the final quality or cost-price of the mortar or concrete or other castable material. By "castable material" is meant here, castable and hardenable material of general known use, such as rubber, plastics, mortar and concrete.

As mentioned hereinabove, the binder must have a sufficient, but in some cases not excessive, affectability by the disintegration ingredient. After contact with the disintegration ingredient, a first moment is reached where the reinforcing members come to substantial subdivision. The duration to reach this moment is called the duration of resistance to substantial subdivision by the disintegration ingredient. In the case where the reinforcing members were already mixed before introduction of the disintegration ingredient, the duration of resistance to substantial subdivision to the disintegration ingredient can be zero, and the affectability of the binder can be made very high. But in the case where the reinforcing members are not, or not yet completely, uniformly distributed when coming in contact with the disintegration ingredient, then the duration of resistance to substantial subdivision is expected to procure the delay time necessary to uniformly distribute the reinforcing members. Such duration of resistance to substantial subdivision by the disintegration ingredient will be preset in the range between 0 and 120 seconds. When the members are for use in the method where they are introduced directly in presence with the disintegration ingredient, this duration will be preset in the range between 10 and 120 seconds, preferably between 15 and 45 seconds. When these members are for use in the method where they are firstly uniformly distributed before coming in contact with the disintegration ingredient, then the duration of resistance to subdivision can be made very short, from 0 to 10 seconds, preferably not more than 30 seconds and even not more than 20 seconds. It will be noted that the members having the preferred duration between 15 and 45 seconds, are usable for both methods without excessive loss of time.

Figure 2:
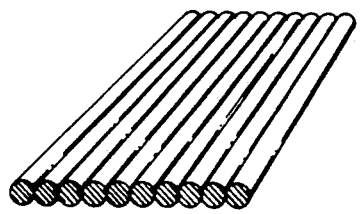
FIG. 2 shows an embodiment of a reinforcing member according to the invention.

Once the reinforcing members are substantially subdivided, they are expected rapidly to disintegrate into individual elements which must rapidly be further distributed in the mix, because now the danger of entanglement exists when this second period of mixing is unnecessarily prolonged, especially for high percentage concentration, above the curve of mixability of the individual reinforcing elements in the mix being used (analog curve to curve (a) in FIG. 1). The total duration of such period of further disintegration and mixing must however be long enough to allow the reinforcing members further to disintegrate into individual reinforcing elements and to be substantially equally distributed and randomly oriented. In general, e.g. for conventional mortar or concrete, the duration of this period will not be shorter than 20 seconds and in most cases not shorter than 30 seconds. It is preferred not to prolong this period over 120 seconds, in most cases not over 60 seconds.

So, the conditions for the binder in a reinforcing member, to be usable in a method according to the invention for making a mixture can be summarized by:

(a) In absence of the disintegration ingredient, the reinforcing members must show a duration of resistance to subdivision by the mixing movement of at least 10 seconds, preferably at least 30 minutes.

(b) In presence of the disintegration ingredient, the reinforcing members must show a duration of resistance to substantial subdivision which ranges between 0 and 120 seconds, preferably between 15 and 45 seconds.

(c) The members must show a further duration between substantial subdivision and substantial disintegration into individual reinforcing elements, which is not higher than 120 seconds, preferably not higher than 60 seconds, and these conditions relate to the type of mixture in which the reinforcing member is to be used.

For example for mortar and concrete and other materials bound through water-activation, water can be used as the disintegration ingredient when the binder is disintegratable in water, the disintegration of the binder by the water being effected by either chemical or physical means, e.g. by dissolution of the binder in water. A preferred water-soluble binder for use in the invention is polyvinyl alcohol. The degree of solubility of the binder can be regulated by the incorporation therein of non-soluble additives, such as polyvinyl acetate. Depending on the desired strength of the binder to keep the elements together under mixing conditions without disintegration ingredient, and on the desired duration of resistance to subdivision by the disintegration ingredient, the binder may contain up to 20% of the polyvinyl acetate for a low resistance to disintegration, from 20 to 50% of polyvinyl acetate for an average resistance and from 50 to 80% of polyvinyl acetate for a high resistance to disintegration. A binder having above polyvinyl acetate, for instance, and also including a soft-making agent under influence of water, may be suitable to keep the elements together during dry mixing, and to allow disintegration under influence of water, and such soft-making need not necessarily occur by the solubility of the agent, as is the case for polyvinyl alcohol. For instance, polyvinyl alcohol forms a stronger bonding film when used in admixture with polyvinyl acetate. When a soluble additive is desired, however resins of urea can be used. It will be appreciated that other soluble binder can also be used with water as the disintegration ingredient in mortar or concrete, such as polyacrylates, albumins, gelatins, caseins or cellulose derivatives, e.g. methyl-, hydroxy- or carboxy-, cellulose- etc. These binders may also comprise other non-soluble additive depending on the desired resistance to disintegration.

In mortar and concrete not only water can serve as disintegration ingredient, but also the other ingredients which are sometimes used such as those that serve to enhance the castability or the resistance to frost and others. Also special ingredients could be used which have no other function that to disintegrate the binder of the reinforcing members, and which are of no harm to the material or to the process of making it. Disintegration can also be provoked by introducing steam in the mixture, for using e.g. the heat of the steam to dissolve the members. But, as pouring water into the mixture is the most common operation in making mortar or concrete, it is clear that this is the ingredient that in most cases will be used as disintegration ingredient.

As a guideline for possible use of reinforcing members in the method of the invention for making materials on cement-basis (mortar or concrete), the conditions (a) to (c) hereinabove are better expressed in the form of the following standard test:

Standard mortar: 2 parts by weight of sand (river sand, mesh 0-3 mm) 1 part of cement ½ part of water Standard mixer: cylindrical container, 39 cm diameter, 18 cm height, vertical axis, open at the top rotating around vertical axis. two straight vertical mixer arms extending vertically into the container down to its bottom; in diametrically opposed relationship with respect to their vertical axis of rotation; arms are substantially uniplanar in the radical direction with breadth of 4 cm; inner side of arms at 10 cm distance from axis of rotation; axis of rotation has 5 cm eccentricity with respect to axis of rotation of container.

Standard mixing movement: container: 60 r.p.m.—arms in opposite sense 16 r.p.m.

Standard quantity of reinforcing members: 1% by volume

If the disintegration ingredient is different from water poured into the mix:

(a) Test of resistance to subdivision in absence of disintegration ingredient: duration of resistance to substantial subdivision: at least 10 seconds, preferably at least 30 minutes after introducing the reinforcing members and under the standard mixing conditions.

(b) Test of resistance to subdivision by disintegration ingredient: use different mixtures ranging in 5 to 40% by weight of disintegration ingredient, and for each mixture observe the duration until substantial subdivision after introducing the disintegration ingredient under the standard mixing conditions. At least one mixture must show a duration under 120 seconds, preferably in the range of 15 to 45 seconds.

(c) Test of resistance to further disintegration by disintegration ingredient. Use the same mixtures under (b) after observing the moment of substantial subdivision and continue to mix during 120 seconds. In at least one mixture which answered to tests a and b, the reinforcing elements must be 90% separated from each other. Preferably this occurs after continuing to mix only for 60 seconds.

If disintegration ingredient is the water poured into the mix: the test (a) is the same, but without water in the mixture. The tests (b) and (c) are the same, but the water content in the standard mixture ranges from 5 to 40% by weight.

Although these limits must not be considered as absolute, these general guidelines form in general a good criterion for the notion of an appropriate binder with sufficient bonding strength and sufficient affectability by a disintegration of an appropriate binder with sufficient bonding strength and sufficient affectability by a disintegration ingredient, for being usable as reinforcing member in mortar and concrete.

The method of using the reinforcing members presents a range of variants, and for each determined method the reinforcing members will be chosen with appropriate characteristics as determined hereinabove.

In a first method, the reinforcing members are introduced in the mix when this mix already comprises the disintegration ingredient, because it has been introduced therein before, or at the same time. For mortar and concrete, more specifically, the first period of mixing the members before subdivision is made to last between 10 and 120 seconds. This depends on the necessary time to distribute the reinforcing members substantially in the mix, and this in its turn depends on the quantity, composition of the mix and the type of mixer. This first period is fixed by choice of the reinforcing members having the adapted characteristics of resistance to the disintegration ingredient. Preferably, mixtures will be prepared which only need 15 to 45 seconds for the first period. In general, water will be used as disintegration ingredient, and reinforcing members having binders which are affectable by water. Once the reinforcing members are allowed to subdivide, the further mixing (second period) serves for uniform distribution of the individual reinforcing elements. For mortar and concrete more specifically, the duration of this second period will not be shorter than 20 seconds and in most cases not shorter than 30 seconds. This depends again on the necessary time for disintegration and further uniform distribution of the reinforcing elements. It is preferred not to prolong this second period over 120 seconds, in most cases not over 60 seconds, in dependence on the danger of entanglement which comes up once the reinforcing members are disintegrated, and also depending on the shapes of the elements.

This first method is very suitable for large scale rapid production in situ, where all the components are brought together and mixed, and are ready for pouring after a short time, such as 2–3 minutes. Sometimes however, the mortar or concrete must continue to be mixed after it is ready, because it can not directly be poured. This is the case of mixers on lorries on the way to their destination. In this case, the reinforcing members, such as those utilized in the first method, are only introduced into the mix some 2–3 minutes before the concrete or mortar is poured out. Another possibility exists in introducing the disintegration ingredient some 2–3 minutes before, instead of the reinforcing members. This is more easy, because in general this disintegration ingredient is water or can be another liquid, of which the introduction can be more easily commanded, e.g. from the cab of the lorry. The reinforcing members in this second method, must not have resistance to substantial subdivision in presence to the disintegration ingredient, because they can directly start to disintegrate, as the reinforcing members are already well-mixed before. But if they have a minimum resistance of, say 15 seconds, they can serve for the first and second method as well. However, the reinforcing members for this second method must have a high resistance to substantial subdivision in absence of the disintegration member, in order not to subdivide and begin to entangle before the moment is reached of introducing the disintegration ingredient. In using this second method, the first period will depend on the circumstances and may last up to 30 minutes, and the second period will last about the same time as for the first method: not shorter than 20 seconds and in most cases not shorter than 30 seconds, and will not be prolonged over 120 seconds, in most cases over 60 seconds.

If there are some ingredients and additives which were not introduced in the first mixing period, it will be necessary to introduce them into the mix during this second period of mixing, so that all the ingredients are then mixed together to obtain the final composition. It is even possible to add another dose of reinforcing members and have them directly disintegrated and distributed during the second period, as will appear from Example 4 hereinafter.

Figure 4:
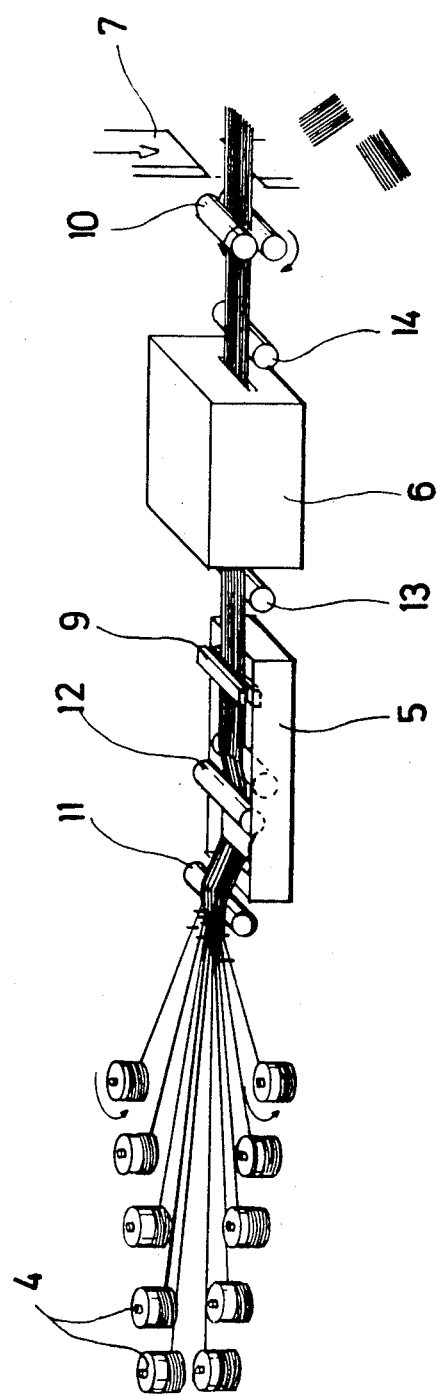
FIG. 4 shows how a member according to FIG. 2 can be made.

Making reinforcing members according to the invention does not present any particular difficulty. For example, a reinforcing member as shown in FIG. 2, in which a number of straight reinforcing elements aligned side by side in one plane, can be made by an apparatus of which a schematic view is shown in FIG. 4. This apparatus comprises a number of pay-off bobbins 4, a tank 5 for housing the binder liquid, a wiper 9, a drying oven 6, a cutter 7, a number of guiding rolls 11 to 14, and a pair of friction drive rollers 10. In operation, the wires are drawn from the bobbins 4, and led in parallel relationship, side by side, over guiding roll 11 and into the tank 5, where they are dipped into the binder. On emergence from the tank the wires pass through the wiper 9 where excess binder is wiped off, only letting the interspaces between the wires be filled. Then the strip so formed is drawn through the drying oven 6, where the binder solidifies. The solid strip then passes between the drive rollers 10, which serve to draw the wires from their bobbins 4 through the apparatus, and the strip is then pushed into the cutter 7 where it is cut into reinforcing members as shown in FIG. 2. Such process need not necessarily be carried out continuously in line as shown here, but the method can also be applied discontinuously with separate bundles. Before being chopped, the wire strips can also be deformed in a direction perpendicular to the strip, in order to procure elements of FIG. 3.

As previously mentioned it is also possible to make reinforcing members according to the invention from a cable comprising one or more twisted strands. The cable is then also provided with a binder e.g. by dipping or spraying and then drying or hardening. Subsequently the cable is chopped into pieces, at distances which are sufficiently short with respect to the pitch as to allow the members to disintegrate.

In making reinforcing members according to the invention the binder will be chosen to provide a bond strength and affectability suitable for the anticipated mixing conditions and for the intended time of introducing the disintegration ingredient, so as to procure the necessary time delay before substantial disintegration of the reinforcing members, during which time delay the said members are mixed up to substantially equal distribution. When the disintegration ingredient is introduced at the beginning of the mixing process, the binder will be adapted to the quantity of the disintegration ingredient and to the other mixing conditions in order to procure a time delay generally between 10 and 120 seconds, preferably between 15 and 45 seconds. When however the disintegration ingredient is introduced later in the mixing process, to allow the reinforcing members first to be distributed substantially equally, then the binder may be adapted to effect a time delay, between introduction of the disintegration ingredient and substantial subdivision of the reinforcing members, of up to 30 seconds and preferably up to 20 seconds (0-30 seconds, or 0-20 seconds).

Some examples of processes according to the invention will now be given in detail.

EXAMPLE 1

Standard mortar composition of 2 parts by weight of sand, 1 part of cement, ½ part of water.

Straight reinforcing elements of hard drawn steel (tensile strength 140 kg/mm$^2$); length 30 mm, diameter 0.35 mm (l/d=85).

Reinforcing members formed of 10 reinforcing elements side by side in one plane (as FIG. 2); the binder being polyvinyl alcohol with 20% of polyvinyl acetate; the concentration of steel 3% by volume (point A in FIG. 1; in the zone of non-mixability of the individual reinforcing elements with respect to the curve (a) of mixability in the standard mortar).

All the dry ingredients, reinforcing members included, are dumped in bulk in the standard mixer as described hereinbefore and mixed in the already mentioned standard conditions for 30 seconds. The water is then added followed by mixing for another 30 seconds.

After the first 30 seconds period the dry mixture showed a substantially regular and randomly oriented distribution of mostly undivided reinforcing members. The final mixture, after the second 30 seconds period, showed a substantially regular and randomly oriented distribution of mostly individual reinforcing elements.

EXAMPLE 2

The same standard mortar composition as in Example 1.

Straight reinforcing elements of the same steel and diameter as Example 1, but of length 40 mm (l/d=114).

Reinforcing members formed as in Example 1; the concentration of steel 2% by volume (point B in FIG. 1).

Same mixer and mixing conditions as in Example 1.

Similarly satisfying results were obtained as in Example 1. After the second 30 seconds mixing with water the mixing was prolonged for another 20 seconds more and a tendency for conglomeration into balls was observed.

EXAMPLE 3

Concrete: 1.5 parts by weight of sand; 1 part of cement; 2.5 parts of coarse aggregate (4-8 mm); 0.55 parts of water. Curve of mixability of individual elements shown by (b) in FIG. 1.

Reinforcing members as in Example 1 (l/d=85); mixing conditions as in Example 1, using 1.4% by volume of steel (point C on FIG. 1).

No results obtained but the figures of this example are included in order to give meaning to Example 4.

EXAMPLE 4

Concrete: 1.52 parts by weight of sand; 1 part of cement; 3.05 parts of coarse aggregate (half 4-8 mm and half 8-16 mm) water: 0.45 parts. Curve of mixability of individual elements not recorded but obviously worse than in Example 3 (less water and more coarse aggregate).

Reinforcing members as in Example 1 (l/d=85). Standard mixer and mixing conditions as in Example 1.

All the dry ingredients, 0.65% by volume of the reinforcing members included (point D on FIG. 1), were dumped in bulk into the mixer and mixed for 30 seconds. Then the water was added and further mixed for another 30 seconds. Then the remaining 0.35% by volume of the reinforcing members were dumped in bulk directly into the wet mixture and further mixed for 35 seconds (point E on FIG. 1).

After the first 30 seconds the dry mixture showed a substantially regular and randomly oriented distribution of mostly undivided reinforcing members. After the following 30 seconds of wet mixing the mixture showed an equal substantially regular and randomly oriented distribution of mostly individual reinforcing elements. During the following 35 seconds, the 0.35% of new reinforcing members showed to have substantially disintegrated and again a substantially even distribution of mostly individual reinforcing elements was obtained.

By these examples it has been shown that mixtures can easily be made with a volume percentage of reinforcement in combination with an l/d ratio which are situated, on the diagram of mixability of FIG. 1, in a region of what was previously regarded as difficult mixability or even beyond the previously attainable limit of mixability. This mixability was moreover previously measured with the reinforcing elements introduced in the form of a continuous shower, whilst in the examples the reinforcing members were simply poured in bulk. Moreover, in the container in which the reinforcing members are shipped there is substantially no danger of entanglement into balls and in most cases, such as the case of bundled parallel reinforcing elements, a greater weight can be packed in the same volume.

While this invention has been described, it will be understood that it is capable of further modification, and this application is intended to cover any variations, uses and/or adaptations of the invention following in general, the principle of the invention and including such departures from the present disclosure as come within known or customary practice in the art to which the invention pertains, and as may be applied to the essential features hereinbefore set forth, as fall within the scope of the invention or the limits of the appended claims.

What is claimed is:

1. A process of preparing a mixture of cementitious castable material such as mortar or concrete, which mixture comprises a multiplicity of small elongate fiber reinforcing elements made of steel, iron or an iron alloy, the process comprising preparing a mixture of ingredient material for said castable material, introducing into said mixture a plurality of reinforcing members being in the form of groups of said reinforcing elements, having a thickness between about 0.1 and 1 mm and a length-to-thickness ratio between about 50 and 200, bound together in a group by a binder affectable by a disintegration ingredient, then mixing said mixture, causing thereby said reinforcing members to be substantially uniformly distributed therein, and further mixing said mixture, causing thereby said reinforcing members to be disintegrated by means of said disintegration ingredient into separate elements, which are further substantially uniformly distributed in the mixture.

2. A process according to claim 1, in which process said reinforcing members are introduced in the mix comprising said disintegration ingredient, and the mixing to distribute said reinforcing members is carried through during the delay time before said members are substantially subdivided, said delay time being procured by the duration of resistance of the binder of the used reinforcing members to the disintegration ingredient.

3. A process according to claim 1, in which process said disintegration ingredient is introduced in the mix after introduction of said reinforcing members, and the mixing to distribute said reinforcing members is carried through during the delay time between introduction of the of the reinforcing members and the moment when said members are substantially subdivided.

4. A process according to claims 1, 2 or 3 in which process the castable material is a material on the basis of water-activated binder, such as mortar or concrete.

5. A process according to claim 1 in which process the castable material is a material on cement-basis.

6. A process according to claim 5 in which process the used disintegration ingredient is water.

7. A process according to claims 2 or 6 in which said delay time ranges between 10 and 120 seconds.

8. A process according to claim 7 in which said delay time ranges between 15 and 45 seconds.

9. A process according to claims 3 or 6 in which the lapse of time between introduction of the water as disintegration ingredient and the moment when said members are substantially subdivided, is shorter than 30 seconds.

10. A process according to claim 9 in which the lapse of time between introduction of the water as disintegration ingredient and the moment when said members are substantially subdivided, is shorter than 20 seconds.

11. A process according to claim 1 in which the duration of further mixing after causing substantial subdivision of the reinforcing members is not longer than 120 seconds.

12. A process according to claim 11 in which said duration is not longer than 60 seconds.

* * * * *